Patented June 11, 1940

2,203,744

UNITED STATES PATENT OFFICE 2,203,744

INSECTICIDE

Charles H. Peddrick, Jr., Northville, N. Y., assignor to Feldspathic Research Corporation, New York, N. Y., a corporation of Delaware No Drawing. Application October 28, 1938,
Serial No. 237,463

4 Claims. (Cl. 167—14)

This invention relates to insecticides and has for its object to provide an efficient, economical material of this type for use in all fields where control of insects and lower animal life is required.

Another object of the invention is to provide a dry, powdered insecticide which is free flowing and non-caking under practically all conditions of use and is therefore particularly adapted for admixture with grains or for suspension in the air or dusting on surfaces to be protected, and is capable of destroying parasites by its desiccative and paralyzing action as well as by its toxic effect.

I have found that pyrophyllite, a hydrous aluminum silicate represented by the formula $Al_2O_3.4SiO_2.H_2O$, possesses valuable insecticidal properties. Because of its specific gravity and physical structure this mineral, when finely ground, will remain suspended in the air, and apparently the mineral particles are drawn into the tracheal system of insects, resulting in suffocation and removal of body moisture. In any event, death will result in time when the insect is left exposed to pyrophyllite dust.

However, finely ground or powdered pyrophyllite tends to form into little balls or nodules, which prevents the mineral from flowing freely and reduces its efficacy as an insecticide. This tendency to cake or agglomerate is apparently due to the polarity of the static charge of electricity held by each of the little mineral particles. The finer the grinding, the more pronounced is this tendency; and the greater the tendency to cake, the less effective will be the insecticidal action insofar as it depends upon the tracheal and desiccating action referred to above.

I have now discovered that by treating a granular or powdered pyrophyllite with a reagent containing a fluorine radical, the polarity of the static charge of electricity on the mineral particles is changed in such a way that the individual particles tend to repel one another with the result that the powdered mass becomes free-flowing and non-caking, and the treated particles acquire a high quality of diffusion in the air and in liquids, and I have also discovered that this treatment greatly increases the suffocating, desiccating and toxic effects of the mineral particles. Besides, I have found that similar results are obtained by treating bauxite, alunite and topaz in the same manner as hereinafter described.

As reagents for accomplishing the above results I use any liquid or gaseous reagent containing a fluorine radical, particularly hydrofluoric acid, fluosulphonic acid, or silicon tetrafluoride gas. When granular or powdered pyrophyllite, bauxite, alunite or topaz is treated in this manner a new material is formed, each treated grain or particle apparently consisting of the original unaltered mineral plus aluminum fluoride of the formula $AlF_3$. The treated particles are not only more effective than the untreated mineral particles as a suffocating and desiccating agent, but they are also considerably more toxic or poisonous to insects and other lower forms of life. The mineral pyrophyllite, bauxite, alunite and topaz all contain alumina in a form which is readily attacked by the fluorine reagent, forming $AlF_3$, while the silica attacked by the reagent is driven off as silicon tetrafluoride gas. The reaction is carried only to the point where the surfaces of the individual mineral grains are etched, whereby each grain will consist of the unaltered mineral plus $AlF_3$ and will therefore perform the dual role of a suffocating or desiccating agent and a poison. In addition, the minerals treated in this manner are free-flowing and have a high quality of diffusion in liquids and in the air.

In practice, the comminuted pyrophyllite, bauxite, alunite or topaz may be treated in various ways with a liquid or gaseous reagent containing a fluorine radical. For example, the liquid or gas may be introduced into a mixer containing the finely divided mineral particles, and the contents of the mixer agitated for a period of time sufficient to render the individual mineral particles repellent to one another; or a suitable liquid reagent may be introduced directly into a chamber containing the mineral particles and the contents of the chamber heated to gasify and diffuse the reagent through the particles; or the comminuted mineral may be passed through a heated chamber counter-current to a stream of gaseous reagent in any suitable manner.

As an illustration of the invention, a number of drops of hydrofluoric acid were placed in a container partially filled with 325 mesh pyrophyllite. Sufficient heat was applied to the container to quickly volatilize the hydrofluoric acid. The released hydrofluoric acid gas quickly filled the closed container and acted upon the particles of pyrophyllite. The gas readily attacked the silica in the pyrophyllite to form $SiF_4$. The reaction resulted in etching the surface of the grains and evidently changed the polarity of the static charge on the particles. As a result, a marked difference could be observed by the naked eye in the texture of the treated mass.

In the above example the quantity of acid used was relatively small and it reacted so quickly with the mineral that very little pressure was developed in the container. The heat applied was somewhat less than 300° F. since temperatures over 300° F. would tend to cause excessive pressure in a closed container of the type employed. However, under other conditions where excess pressure is not encountered I have found that any temperature between 110 and 390° F. is sufficient. For best results the mineral should be ground to 200 mesh or finer.

The pyrophyllite treated as in the above example proved much more effective in destroying insects than untreated pyrophyllite. In one case where Japanese beetles were used in a test, the beetles lived more than twelve hours when dusted with untreated 325 mesh pyrophyllite while other test beetles lived less than six hours when dusted with 325 mesh pyrophyllite treated in the manner described above. Certain small beetles of the weevil type were all killed in four hours with dry powdered pyrophyllite treated in the manner described. Very satisfactory results were also obtained with treated bauxite, alunite and topaz.

As a result of my investigations it appears that my treated pyrophyllite, bauxite, alunite or topaz particles taken into the tracheal system give up $AlF_3$ to the body fluid of the insect. Hence to the suffocating and drying action is added a paralyzing effect. Death occurs through inhalation of fewer particles and in much less time than when various standard insecticides are used. Furthermore, the stoma or breathing holes in some lower forms of life are so well protected that very few particles can enter, and it might be impossible to get enough mineral particles through these openings to cause death from suffocation or desiccation alone whereas the toxic effect of my treated minerals will result in death.

Particles of pyrophyllite, bauxite, alunite and topaz treated in the manner described above are a much more effective drying agent than the untreated minerals or various standard insecticides which I have investigated. For this reason my insecticide is especially effective when a drying action is required as in killing termites and certain weevils. My insecticides may be used alone or in admixture with other materials having insecticidal properties, depending upon the particular purpose which it is desired to accomplish. Besides being free-flowing and capable of indefinite suspension in the air, my insecticide also has a high diffusion in liquids so that in appropriate cases it may be used in suspension in liquid carriers which may either possess insecticidal properties themselves or else may be inert and preferably volatile so that they will evaporate and leave the solid particles of insecticide deposited on the surfaces to be protected.

The invention is not to be limited to the particular methods or conditions of treatment which are disclosed herein for purposes of illustration as it is capable of various modifications and adaptations within the scope of the appended claims.

The invention claimed is:

1. An insecticide comprising a finely divided mineral selected from the class consisting of pyrophyllite, bauxite, alunite and topaz, the individual particles of which contain a partial coating of aluminum fluoride.

2. Method of producing an insecticide which comprises treating a finely divided mineral selected from the class consisting of pyrophyllite, bauxite, alunite and topaz with a reagent containing a fluorine radical capable of reacting with the mineral to form a partial coating of aluminum fluoride on the individual particles.

3. Method of producing a dry, free-flowing insecticide which comprises treating a mineral of 200 mesh or finer selected from the class consisting of pyrophyllite, bauxite, alunite and topaz with a reagent containing a fluorine radical capable of reacting with the mineral to form a partial coating of aluminum fluoride on the individual particles.

4. A dry, free-flowing insecticide comprising pyrophyllite of 200 mesh or finer in which the individual mineral particles contain a partial coating of aluminum fluoride.

CHARLES H. PEDDRICK, Jr.